(12) United States Patent
Ergen et al.

(10) Patent No.: US 11,606,409 B1
(45) Date of Patent: Mar. 14, 2023

(54) OPTIMIZING QUALITY OF EXPERIENCE (QOE) LEVELS FOR VIDEO STREAMING OVER WIRELESS/CELLULAR NETWORKS

(71) Applicant: AMBEENT INC., Yuba City, CA (US)

(72) Inventors: Mustafa Ergen, Istanbul (TR); Mehmet Fatih Tuysuz, Istanbul (TR)

(73) Assignee: AMBEENT INC., Yuba City, CA (US)

( * ) Notice: Subject to any disclaimer, the term of this patent is extended or adjusted under 35 U.S.C. 154(b) by 8 days.

(21) Appl. No.: 17/455,720

(22) Filed: Nov. 19, 2021

(51) Int. Cl.
  *G06F 15/16* (2006.01)
  *H04L 65/80* (2022.01)
  *H04L 67/10* (2022.01)
  *H04L 65/75* (2022.01)

(52) U.S. Cl.
  CPC .............. *H04L 65/80* (2013.01); *H04L 65/75* (2022.05); *H04L 67/10* (2013.01)

(58) Field of Classification Search
  CPC .......... H04L 65/80; H04L 65/75; H04L 67/10
  See application file for complete search history.

(56) References Cited

U.S. PATENT DOCUMENTS

| 2002/0083118 A1* | 6/2002 | Sim ...................... G06F 16/188 718/105 |
| 2015/0081847 A1* | 3/2015 | Hao ...................... H04L 65/762 709/219 |
| 2016/0080442 A1* | 3/2016 | Justice ................... H04L 67/10 709/219 |

\* cited by examiner

*Primary Examiner* — Padma Mundur
(74) *Attorney, Agent, or Firm* — Chip Law Group

(57) ABSTRACT

Provided is a method and system for a network-assisted Quality of Experience (QoE)-based smart and proactive video streaming framework to be deployed at Multi-access Edge Computing (MEC) servers. Quality of Experience (QoE) levels for a plurality of video sessions streamed from a cloud server to computing devices through a central edge server are estimated based on one or more metrics associated with the plurality of video sessions. Additionally, channel status of one or more neighboring edge servers proximate to the central edge server is determined. The QoE levels of the plurality of video sessions are then maximized based on the estimating, by employing a local optimization, a global optimization and a combination of both the local optimization and the global optimization based on the one or more metrics and the channel status determined for the one or more neighboring edge servers.

18 Claims, 7 Drawing Sheets

OPTIMIZING QUALITY OF EXPERIENCE (QOE) LEVELS FOR VIDEO STREAMING OVER WIRELESS/CELLULAR NETWORKS

CROSS-REFERENCE TO RELATED APPLICATIONS/INCORPORATION BY REFERENCE

None.

FIELD

Various embodiments of the present disclosure generally relate to video streaming traffic that are transmitted/received over wireless/cellular interfaces. Specifically, the present disclosure relates to a method and system for a network-assisted Quality of Experience (QoE)-based smart and pro-active video streaming framework to be deployed at Multi-access Edge Computing (MEC) servers.

BACKGROUND

Over the last few years, the size of video streaming traffic transmitted/received over wireless/cellular interfaces of smart mobile devices has increased tremendously, dominating the Internet. Although today's advanced radio access technologies, such as, but not limited to, IEEE 802.11ac and 5G, have facilitated fast and reliable transmission of high-definition massive video traffic, the experienced video quality is mostly lower than anticipated because of high latency based on the distance between sources (for example, cloud servers) and end-hosts (computing devices).

Multi-access Edge Computing (MEC) paradigm is expected to handle this issue by deploying MEC servers at network edges and pushing computation, content delivery, storage and virtualization towards edges. However, the implementation of MEC requires a set of complex operations and protocols to enable MEC servers to communicate among themselves, or between resources and endpoints.

Furthermore, a huge amount of Internet traffic is produced by video streaming applications (apps). In this context, Video on Demand (VoD) and live video streaming applications are important fields for research both in academia and industry since Mobile Network Operators (MNOs) and Content Service Providers (CSPs) are seeking better ways to alleviate video-centric massive traffic and provide users with high Quality of Experience (QoE).

Today's advanced radio access technologies, such as Wi-Fi and 5G, enable vast amount of data and applications to be transmitted, analyzed and manipulated rapidly and effectively than ever before, shifting the mobile computing concept from the centralized cloud to distributed edges. Hence, computation-intensive and latency-critical applications are expected to run in real-time seamlessly over edge servers, contrary to the cloud services positioned at distant points, or user-equipment (UE) with limited resources (for example, battery, CPU, memory).

The online video streaming services supported by Content Delivery Networks (CDNs) only through the cloud servers result in a drop in QoE levels because of the high latency that occurs during data/video transmissions. Other network-related issues such as unstable and error-prone wireless/cellular channel quality, a higher number of connected devices and user mobility also drastically affect the QoE levels of the videos being streamed. In this regard, Dynamic Adaptive Video Streaming over Hypertext Transfer Protocol (HTTP) (DASH) protocol has been proposed as a solution as it enables video players to switch to the most suitable/optimal video bitrate to increase QoE levels of video sessions, thus reducing/avoiding play-out interruptions.

Widespread use and ubiquitous coverage of wireless/cellular networks have also led to the fact that most of today's video streaming traffic is carried out by mobile devices. Since Radio Access Networks (RANs) are also involved in end-to-end data/video delivery, Quality of Service (QoS) related parameters such as, but not limited to, latency, jitter, error rate, and downlink throughput, are expected to fluctuate dramatically as a result of error-prone wireless medium and the congestion resolution mechanism of the Transmission Control Protocol (TCP). This also causes re-buffering, play-out gaps or frequent switching among video bitrates, resulting in sub-optimal QoE.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for optimizing Quality of Experience (QoE) levels for video streaming over wireless/cellular networks is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and system for optimizing Quality of Experience (QoE) levels for video streaming over wireless/cellular networks.

Figure 1:
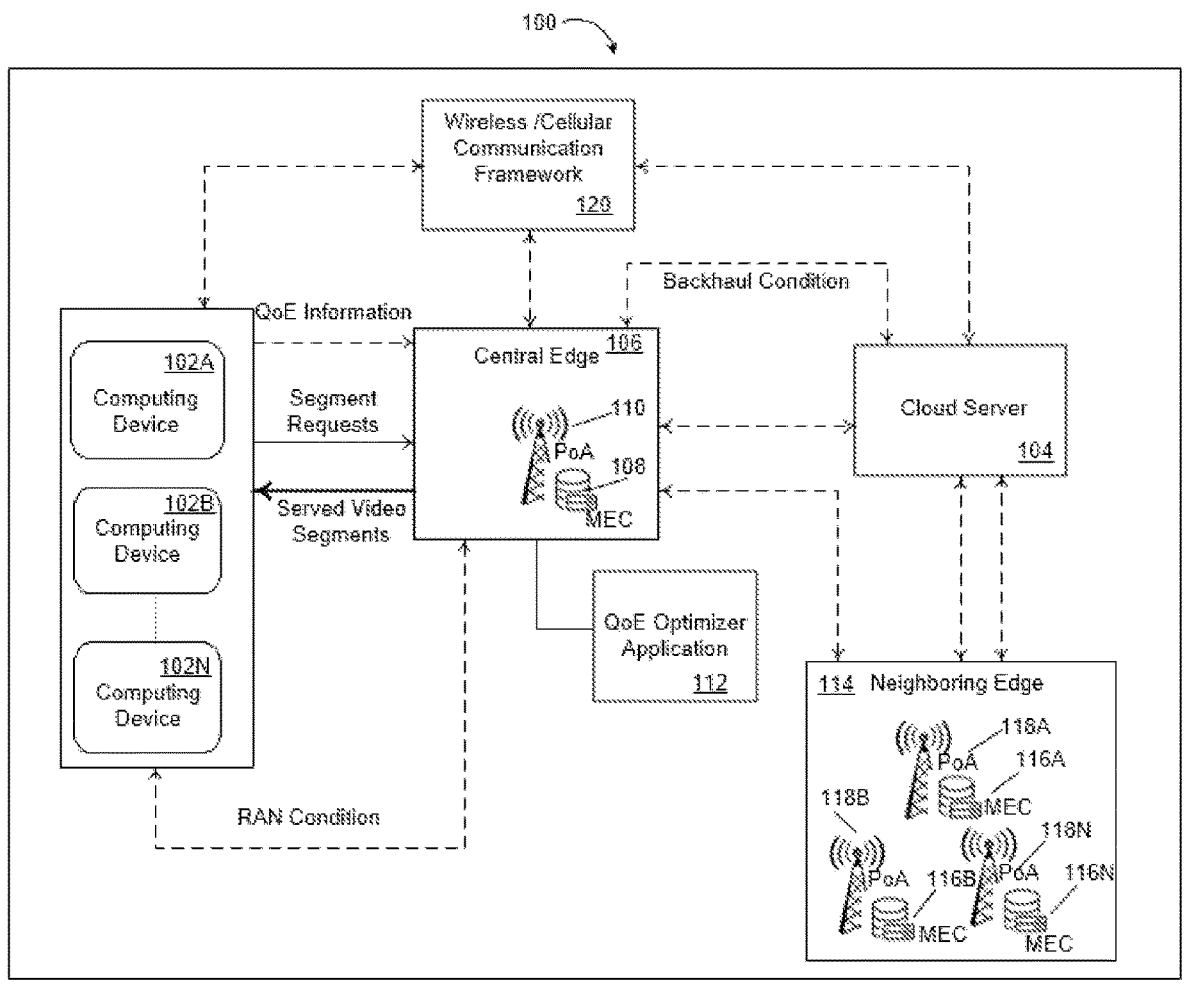
FIG. 1 is a diagram that illustrates a system architecture for optimizing Quality of Experience (QoE) levels for video streaming over wireless/cellular networks in accordance with an exemplary embodiment of the disclosure.

FIG. 1 is a diagram that illustrates a system architecture for optimizing Quality of Experience (QoE) levels for video streaming over wireless/cellular networks in accordance with an exemplary embodiment of the disclosure. Referring to FIG. 1, there is shown a system 100, which includes one or more computing devices 102A-102N, a cloud server 104, a central edge 106 comprising a central Multi-access Edge Computing (MEC) server 108 deployed at a central point of attachment (PoA) 110, a QoE optimizer application 112, a neighboring edge 114 comprising one or more neighboring MEC servers 116A-116N deployed at one or more neighboring PoAs 118A-118N. The system 100 further includes a wireless/cellular communication framework 120 that is used to transmit/receive messages between the one or more computing devices 102A-102N, the cloud server 104, the central edge 106 and the neighboring edge 114.

The one or more computing devices 102A-102N may comprise suitable logic, circuitry, interfaces and/or code that may be operable to communicate data or messages with one or more other computing devices and transmit radio frequency signals when attempting to access local wireless networks. The one or more computing devices 102A-102N are also referred to as user-equipment (UE) and may include, but are not limited to, personal computers (PCs), mobile devices, smart phones, laptops, personal digital assistants (PDAs), multimedia tablets, and phablets.

The cloud server 104 may comprise suitable logic, circuitry, interfaces and/or code that may be operable to support online video streaming services provided by Content Delivery Networks (CDNs) and enable data/video transmissions to the one or more computing devices 102A-102N, the cloud server 104, the central edge 106 and the neighboring edge 114.

The central edge 106 comprises the central MEC server 108 deployed at the PoA 110. The neighboring edge 114 comprises one or more neighboring MEC servers 116A-116N deployed at one or more PoAs 118A-118N.

The central MEC server 108 and the one or more neighboring MEC servers 116A-116N may comprise suitable logic, circuitry, interfaces and/or code that may be operable to support a new generation of 5G services such as Enhanced Mobile Broadband (eMBB) for high bandwidth content streaming, Ultra-Reliable Low Latency Communications (URLLC) for autonomous driving or Massive Machine-Type Communications (mMTC) for a smart city Internet-of-Things (IoT) network. The central MEC server 108 and the one or more neighboring MEC servers 116A-116N may also combine Network Function Virtualization (NFV) and Cloud Virtualization technology to minimize mobile backhaul bandwidth requirements and provide an ultra-low latency edge cloud platform. The central MEC server 108 and the one or more neighboring MEC servers 116A-116N offer cloud-computing capacity within a Radio Access Network (RAN) in close proximity to IoT devices.

The central PoA 110 and the one or more neighboring PoAs 118A-118N may comprise suitable logic, circuitry, interfaces and/or code that may be operable to enable the one or more computing devices 102A-102N to access either a wireless network (for example, a Wi-Fi network) or a cellular network. A PoA may include, but is not limited to, a Wi-Fi Access Point (AP) or a 5G/Long Term Evolution (LTE) Base Station (BS).

The QoE optimizer application 112 is resident on the central edge 106 and comprises suitable logic and/or interfaces that, when executed by a processor, may be operable to communicate with the one or more computing devices 102A-102N, the cloud server 104 and the neighboring edge 114.

In operation, the QoE optimizer application 112 is configured to estimate QoE levels for a plurality of video sessions streamed from the cloud server 104 to the one or more computing devices 102A-102N through the central edge 106. The QoE levels are estimated based on one or more metrics associated with the plurality of video sessions. The one or more metrics may include, but are not limited to, a video bitrate, an initial play-out delay, a re-buffering time, and a video quality switching. The QoE optimizer application 112 is also configured to determine channel status of the one or more neighboring MEC servers 116A-116N proximate to the central MEC server 108. The QoE optimizer application 112 is further configured to maximize the QoE levels of the plurality of video sessions based on the estimating, by performing one of a local optimization, a global optimization and a combination of both the local optimization and the global optimization based on the one or more metrics and the channel status determined for the one or more neighboring MEC servers 116A-116N. 'Local optimization' is performed by only the central MEC server 108 and 'Global Optimization' is performed by both the central MEC server 108 and the one or more neighboring MEC servers 116A-116N. The problem formulation and QoE modeling by the QoE optimizer application 112 are illustrated as follows in accordance with an exemplary embodiment.

Consider there are e edge servers covering a region, u user-equipment (UE) associated with each of these edge servers, and r bitrate representations per UE streaming video sessions through the cloud server 104. Also, it is considered that e−1 of the neighboring edge servers are all available in the same coverage for users to hand/prefetch their data over, if some conditions/rules are met. To maximize the sum of QoE values of all sessions considering the entire video play duration, the QoE optimizer application 112 first identifies the maximum possible video quality level per session. Consequently, the maximization problem of the UE-bitrate-network assignment may be modelled subject to the constraints as follows, $$\text{Maximize} \sum_{i=1}^{u} \sum_{j=1}^{e} \sum_{k=1}^{r} x_{i,j,k} \times QoE_k \quad (1)$$

where Eq. 1 is subject to the following four constraints, $$\sum_{i=1}^{u} \sum_{k=1}^{r} x_{i,j,k} \times b_k \leq C_j, \quad (2)$$

$$x_{i,j,k} \times b_k \leq l_i^j, \quad (3)$$

$$\sum_{k=1}^{r} \sum_{j=1}^{e} x_{i,j,k} \leq 1, \quad (4)$$

$$x_{i,j,k} \in \{0,1\}, \quad (5)$$

where $\forall i \in [1, u]$, $\forall j \in [1, e]$, $\forall k \in [1, r]$. The binary variable $x_{i,j,k}$ indicates whether user i has accessed video representation k from the MEC server j. $b_k$ and $QoE_k$ denote the bitrate of the representation k and the QoE value of the same representation, respectively. The MEC servers have specific assignment capacities ($C_j$), and radio links between UEs and MEC servers have specific link capacities $l_i^j$. In this regard, four constraints given above (Eq. 2 to Eq. 5) ensure that the capacity of any MEC server is not surpassed by the assignment capacity, video representations are not allocated to UEs in case their bitrates cannot be accommodated by the UEs' link capacities, any UE is allocated with one video representation at most, and each UE utilizes one edge network at most, respectively.

In accordance with an embodiment, the DASH protocol comprises four key metrics to help estimate QoE levels of video sessions: (i) video bitrate, (ii) initial play-out delay, (iii) re-buffering time, and (iv) video quality switching. Video bitrate and re-buffering are the two most important factors affecting the video quality level perceived by a user. Avoiding/limiting re-buffering is critical as prevention of re-buffering may also prevent possible bitrate reductions. To prevent re-buffering, a channel condition analysis is performed in terms of expected downlink throughput. The MEC servers play a key role here as they are aware of both radio links between UEs (the one or more computing devices 102A-102N) and PoAs, and access links between the PoAs and the cloud server 104.

For instance, consider each video chunk ($v_i$, where $\forall i \in [1, z]$) contains s seconds of video parts, and is encoded with distinct bitrate representations ($b_k$). Assuming $d(b_k(i))$ is the chunk size of $v_i$ at bitrate $b_k(i)$, and the average download speed is $Dw_i$, then downloading duration of the chunk becomes $d(b_k(i))/Dw_i$. In addition, considering buffers (B) increase/decrease by s seconds depending on whether a new chunk is downloaded, or the chunk is being watched, respectively, the buffer dynamics may be formulated as follows, $$B_{i+1} = \left(\left(B_i - \frac{d(b_k(i))}{Dw_i}\right)_+ + \delta\right)_+ \quad (6)$$

where the notation $(y)_+ = \max\{y, 0\}$ ensures the positiveness, whereas condition of the available buffer to be lower than the chunk download speed ($B_i < d(b_k(i))/Dw_i$) indicates the re-buffering problem.

In this case, the QoE level is formulated as a function of the aforementioned four metrics, so that the QoE level is upgraded in case of a higher bitrate adaptation, and is downgraded in cases of a lower bitrate adaptation, re-buffering, bitrate switching and initial play-out delay. Considering both video bitrates and QoE levels are mapped between 0 and 5, as in Mean Opinion Score (MOS), average bitrate quality ($Q_{avg}$), total re-buffering time ($T_{re-buffering}$), and re-buffering ratio ($R_r$) over z chunks is provided as, $$Q_{avg} = \frac{1}{z}\sum_{i=1}^{z} q(b_k(i)), \forall Q_{avg} \in [0, 5] \quad (7)$$

$$T_{re-buffering} = \sum_{i=1}^{z}\left(\frac{d(b_k(i))}{Dw_i} - B_i\right)_+ \quad (8)$$

$$R_r = \frac{T_{re-buffering}}{T_{duration}}; \quad (9)$$

where $T_{duration}$ is the total session time including play-out gap ($T_{gap}$), video play time (s×z) and re-buffering time.

Additionally, the frequency of bitrate switching, and the proportion of play-out gap may be expressed as $z_{switch}/z$ and $T_{gap}/T_{duration}$, respectively. Hence, the QoE value of any video session is expressed as a weighted sum of the four metrics as follows, $$QoE = Q_{avg} - \alpha R_r - \beta f_s - \gamma g_p \quad (10)$$

where $\alpha$, $\beta$ and $\gamma$ are the weighting parameters of re-buffering ratio ($R_r$), bitrate switching frequency ($f_s$), and play-out gap ($g_p$), respectively.

In order to ensure that the four main parameters ($Q_{avg}$, $R_r$, $f_s$ and $g_p$) affecting the QoE value are always optimal or near-optimal, a parameter-based examination is first performed. In this context, $Q_{avg}$ is directly related to the bitrates of the chunks transmitted to UEs. To achieve the highest value of $Q_{avg}$, maximum achievable bitrates are transmitted to UEs per chunk. To prevent re-buffering, buffers of UEs are always kept above a certain threshold. The $f_s$ is kept as low as possible staying in the range of achievable bitrates per chunk according to the average throughput, and finally the user buffer is filled with fast chunk transmissions initially to reduce the playout-gap. All the four parameters and their related parameters, such as bitrate and available buffer size, are related to the QoS values such as latency, throughput and packet loss rate. In this regard, possible approaches that are expected to increase QoS/QoE values of video sessions, considering not only the channel condition of the central PoA 110 but also the possible collaboration opportunities among the one or more neighboring PoAs 118A-118N, are discussed in accordance with various embodiments.

In accordance with an embodiment, traffic flow between the cloud server 104 and a UE (computing device) is carried out by two different transmission links: a wired access link between the cloud server 104 and a PoA, and a single hop wireless link between the PoA and the UE. Due to the different structures of these two links, monitoring and handling these links independent of each other through TCP splitting may lead to increased QoE values of DASH sessions. In addition, different TCP window sizes may be adapted for DASH sessions within the same PoA according to the bitrate they require. In this way, a QoE drop that is expected to occur as a result of channel fluctuations may be prevented and hence a smooth QoE level may be achieved per session.

Furthermore, buffers of UEs may be emptied or bitrate values of sessions may be reduced in case of a possible congestion in the network, since the throughput values of sessions per unit time is expected to decrease after a congestion or a channel fluctuation. This can be resolved by MEC servers quickly pre-fetching/caching the chunks required for UEs while the network has not yet been congested, and then transferring these chunks from the MEC server directly to the UEs when needed. In case one MEC server is not able to pre-fetch enough of chunks due to its highly loaded capacity, chunk pre-fetching may also be handled through collaborative pre-fetching with the help of other neighboring MEC servers. In this way, QoE increase for sessions may be achieved by receiving support from the one or more neighboring PoA(s) 118A-118N, which pre-fetches chunks for sessions that are not connected to itself and transfers these chunks to the one or more neighboring PoA(s) 118A-118N to which these sessions are connected. Apart from these approaches, handover procedures may be initiated for sessions having weak signal strengths, and hence QoE levels of these sessions may be increased by allowing them to connect to another neighboring PoA that has a higher signal strength. Finally, QoE levels may also be increased by adjusting (decreasing or increasing) the bitrate of each session depending on the channel condition.

These approaches may be utilized to increase the QoE levels of video sessions. Some of these operations, such as collaborative pre-fetching and handover operations, also require collaboration among the edges, therefore local and global parameters may be analyzed separately. A proactive solution is further provided, which can detect network related issues in advance and operate on time, for early detection of any issues/possibilities.

Figure 2:
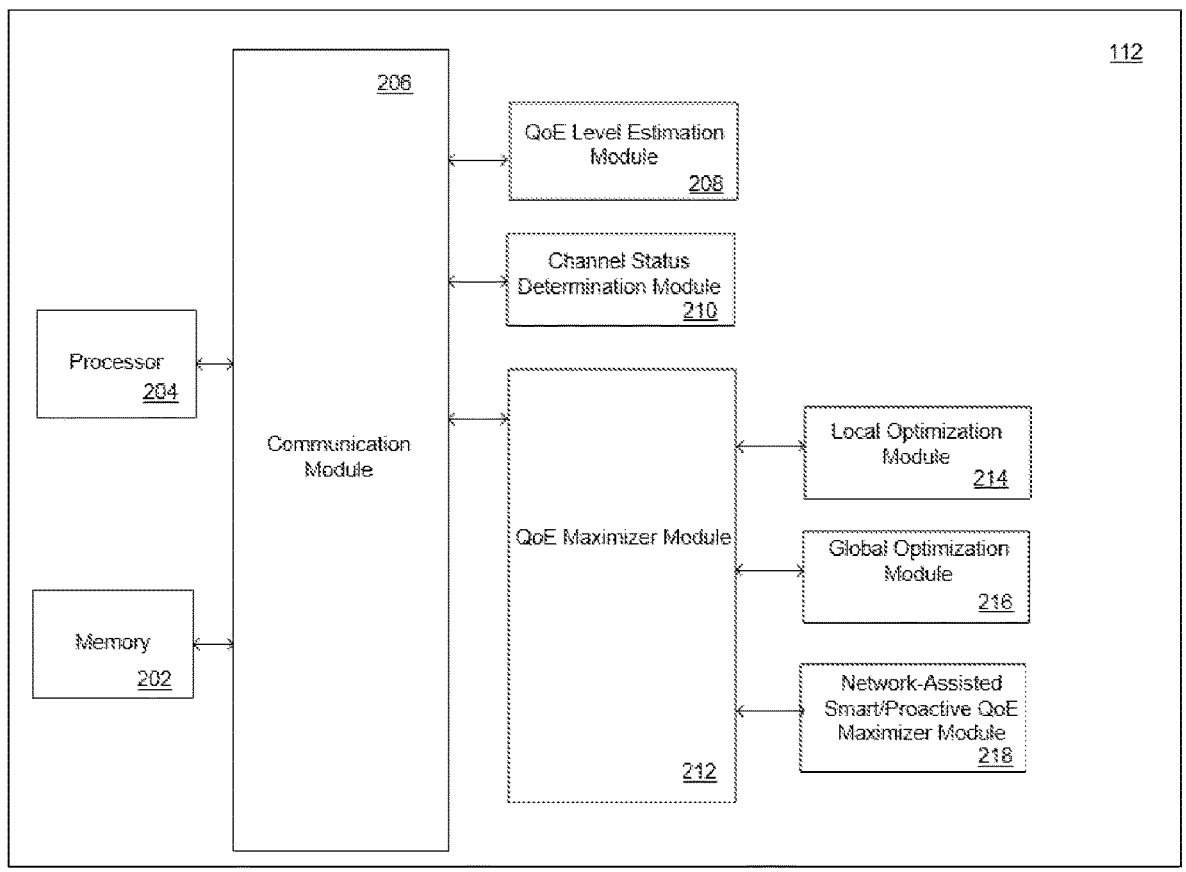
FIG. 2 is a diagram that illustrates various modules of a QoE optimizer application for optimizing QoE levels for video streaming over wireless/cellular networks in accordance with an exemplary embodiment of the disclosure.

FIG. 2 is a diagram that illustrates various modules of a QoE optimizer application for optimizing QoE levels for video streaming over wireless/cellular networks in accordance with an exemplary embodiment of the disclosure. Referring to FIG. 2, there is shown the QoE optimizer application 112, which includes a memory 202, a processor 204 communicatively coupled to the memory 202, a communication module 206, a QoE level estimation module 208, a channel status determination module 210, a QoE maximizer module 212, a local optimization module 214, a global optimization module 216 and a network-assisted smart/proactive QoE maximizer module 218.

The memory 202 may comprise suitable logic, and/or interfaces, that may be configured to store instructions (for example, computer readable program code) that can implement various aspects of the present disclosure.

The processor 204 may comprise suitable logic, interfaces, and/or code that may be configured to execute the instructions stored in the memory 202 to implement various functionalities of the spectrum orchestration application 200 in accordance with various aspects of the present disclosure. The processor 204 may be further configured to communicate with various modules of the QoE optimizer application 112 via the communication module 206.

The communication module 206 may comprise suitable logic, interfaces, and/or code that may be configured to transmit data between modules, engines, databases, memories, and other components of the QoE optimizer application 112 for use in performing the functions discussed herein. The communication module 206 may include one or more communication types and utilizes various communication methods for communication within the QoE optimizer application 112.

The QoE level estimation module 208 may comprise suitable logic, interfaces, and/or code that may be configured to estimate QoE levels for a plurality of video sessions streamed from the cloud server 104 to the one or more computing devices 102A-102N through the central MEC (edge) server 108. The QoE levels are estimated based on one or more metrics associated with the plurality of video sessions. The one or more metrics may include, but are not limited to, a video bitrate, an initial play-out delay, a re-buffering time, and a video quality switching.

The channel status determination module 210 may comprise suitable logic, interfaces, and/or code that may be configured to determine channel status of the one or more neighboring MEC (edge) servers 116A-116N proximate to the central MEC server 108.

The QoE maximizer module 212 may comprise suitable logic, interfaces, and/or code that may be configured to maximize the QoE levels of the plurality of video sessions based on estimating QoE levels for the plurality of video sessions, by performing a local optimization using the local optimization module 214, a global optimization using the global optimization module 216 and a combination of both the local optimization and the global optimization using the network-assisted smart/proactive QoE maximizer module 218, based on the one or more metrics and the channel status determined for the one or more neighboring MEC servers 116A-116N. Local optimization is performed by only the central MEC server 108 and global optimization is performed by both the central MEC server 108 and the one or more neighboring MEC servers 116A-116N.

The local optimization module 214 may comprise suitable logic, interfaces, and/or code that may be configured to perform Transmission Control Protocol (TCP) splitting by adapting different TCP window sizes for each video session of the plurality of video sessions based on a bitrate value required for each video session. The TCP splitting includes performing an explicit window size adaptation operation over split TCP connections to achieve sufficient throughput for each video session of the plurality of video sessions. The explicit window size adaptation operation further includes managing at the central MEC server 108 in real-time, buffer occupancy levels of the one or more computing devices 102A-102N, modifying buffer size values advertised by the one or more computing devices 102A-102N and transmitting the buffer size values that were modified.

The local optimization module 214 is further configured to adaptively pre-fetch and transfer one or more chunks associated with the plurality of video sessions already cached at the central MEC server 108 to a computing device of the one or more computing devices 102A-102N based on a video consumption rate of each video session of the plurality of video sessions and/or a buffer capacity at the central MEC server 108 reaching a certain threshold, to fully utilize front-end throughput between the central MEC server 108 and the computing device.

The local optimization module 214 is further configured to perform Adaptive Bitrate (ABR) adaptation by detecting in real-time, bandwidth and processing capacities of a computing device of the one or more computing devices 102A-102N and adjust a quality of video streams associated with the plurality of video sessions based on the detecting.

In accordance with an exemplary embodiment, the four basic approaches that the central MEC server 108 can perform locally vis-à-vis the local optimization module 214, without the need for different edges (PoAs), aiming to maximize the QoE values of sessions, are further described in detail:

TCP Splitting: A TCP session between the cloud and a user is opened prior to packet transmissions. TCP sessions use congestion and flow control services to adjust packet transmission frequency to avoid overwhelming networks and receivers, respectively. TCP congestion control is negatively affected by the hostile attitude of wireless channels and mobile nature of wireless users, resulting in a radical decrease in throughput. Split connection approaches such as TCP snoop may be used to increase the transmission performance of these types of networks. In this case, the isolation of mobility/wireless-related issues is performed by splitting the TCP connection into two: a wired-connection between a host (computing device) and a PoA, and a wireless-connection between a PoA and a UE. The TCP splitting procedure may also be initiated per video session connected to PoAs. In this way, a standard TCP session, which supports networks/users with congestion and flow control, is initiated per user for the wired communication between the cloud and an MEC server, whereas data transmission in a wireless environment of mobile users is initiated via MEC servers that have context-aware channel/radio information.

Bandwidth-aware Explicit Window Size Adaptation: A flow control mechanism of TCP connections may also result in throughput/fairness issues at dense edge networks. To be more precise, a mismatch between the TCP window size and bandwidth/delay requirement may lead some users to accumulate large queues at the MEC server, while some others are deprived of more throughput. To this end, an explicit window size adaptation operation over split TCP connections is used to achieve enough throughput per video stream. This manages buffer occupancy levels of UEs at edge servers in real-time, modifying available buffer sizes advertised by UEs and transmitting these modified values to the source.

Adaptive Pre-fetching: The path between the cloud and the edge may not always compensate for a selected video bitrate due to constraints of available backhaul throughput, channel fluctuations or user mobility. Pre-fetching data, which is transferring already cached video streams at an edge server to the user, may enable to fully utilize the front-end throughput between the edge server and the user. To this end, an adaptive pre-fetching operation is provided to help users achieve the highest possible QoE value during an entire video session.

The adaptive pre-fetching operation first decides on which chunks and how many of them are to be pre-fetched ahead of users' requests that are in progress. While pre-fetching less chunks than the actual video consumption rate may lead to a higher risk of re-buffering at the UE-side, and pre-fetching too many chunks may cause buffer overflows at the edge server (fast pre-fetching results in increase on the capacity utilization rate as the video play consumption rates will be lower than the pre-fetching rate in any round). Therefore, the MEC server(s) pre-fetch chunks slightly faster than the video consumption rate per video session, or pre-fetch chunks very fast up until the buffer capacity at the edge server reaches a certain threshold. Thus, fast chunk pre-fetching is performed by MEC servers until a certain threshold is met. In this way, the MEC servers perform the following operations: store/cache as many chunks as possible while the path between the cloud and the MEC server has not yet been congested, or the wireless network has not yet been highly loaded with other users, and transfer these chunks from the MEC server directly to the UEs when needed, or until the congestion has ended. The adaptive pre-fetching operation is further described in conjunction with FIG. 3.

Adaptive Bitrate (ABR) Adaptation: The time for rebuffering and the initial play-out gap may be reduced significantly using TCP splitting, bandwidth-aware explicit window size adaptation and adaptive pre-fetching. However, in case of continuous congestion or high channel utilization rate in the backend and/or frontend, required throughput values for some sessions may not be maintained for long periods. In such a case, utilizing the ABR, bitrate of a session having the aforementioned issues may be reduced according to its average throughput, so that the re-buffering problem may be avoided. ABR works by detecting a UE's bandwidth and CPU capacities in real-time and adjusting the quality of the streams accordingly. In this way, very little re-buffering ratio, fast start time, and hence a better perceived experience for both high-end and low-end connections may be achieved. In this context, MEC servers are responsible to find the optimal bitrate chunks to download/pre-fetch, based on the current state of both the backend and the front-end network. In case the congestion is resolved or the number of users on the network decreases, the MEC server can allocate a higher bitrate for the session that previously had problems, according to a new state of the network, and further increase the QoE value of the corresponding session.

The global optimization module 216 may comprise suitable logic, interfaces, and/or code that may be configured to pre-fetch and cache at the central MEC server 108, one or more chunks associated with the plurality of video sessions required for the one or more computing devices 102A-102N and transfer the one or more chunks from the central MEC server 108 directly to the one or more computing devices 102A-102N when needed.

The global optimization module 216 is further configured to perform collaborative pre-fetching using the one or more neighboring MEC servers 116A-116N, if the central MEC server 108 is not able to pre-fetch the one or more chunks due to a highly loaded capacity of the central MEC server 108. The one or more neighboring MEC servers 116A-116N pre-fetch the one or more chunks for the plurality of video sessions that are not connected to the one or more neighboring MEC servers 116A-116N and transfer the one or more chunks to one or more other neighboring MEC servers to which the plurality of video sessions are connected.

The global optimization module 216 is further configured to perform a handover operation for one or more video sessions of the plurality of video sessions having weak signal strengths, by enabling the one or more video sessions to connect to at least one of the one or more neighboring MEC servers 116A-116N having a higher signal strength.

In accordance with an exemplary embodiment, to maximize the sum of QoE values of video sessions, there are two approaches that the one or more neighboring MEC servers 116A-116N perform, vis-à-vis the global optimization module 216, by collaborating with the one or more neighboring edges (PoAs): Proactive Handover and Cooperative Pre-Fetching.

Global optimization approaches are run by the one or more neighboring MEC servers 116A-116N within the vicinity upon request from the central MEC server 108 in case local optimization approaches are not enough to address issues such as, but not limited to, congestion, low Received Signal Strength Indicator (RSSI), highly loaded channels, and to preserve QoE value of a session(s) without decreasing its bitrate. Both handover and cooperative pre-fetching approaches are run in real-time and the result of the algorithm decides whether a handover or a cooperative pre-fetching, or both may be utilized. The two approaches are described as follows:

QoE-aware Proactive Handover: Load balancing in wireless heterogeneous networks may be achieved by transferring some of the load of a highly loaded PoA to other PoAs in the vicinity having less load through handing some sessions over. The initial step in a handover operation is the discovery of available PoAs in the vicinity by periodic or instant message exchanges between the one or more neighboring MEC servers 116A-116N deployed at the one or more PoAs 118A-118N. Frequent message exchanges among the one or more PoAs 118A-118N are useful in case connected users are highly mobile. However, this may result in substantial overhead in a static environment.

In order to reduce the overhead, a smart proactive network discovery and handover mechanism is provided that initiates the discovery and handover operation under two conditions:
(i) In case an MEC server uses its capacity above a certain threshold ($\tau_c$), and
(ii) In case signal strength of a session falls below a pre-defined threshold ($\tau_s$).
In this way, even in the presence of capacity or signal strength-related issues, it is aimed to achieve the highest possible QoE level per session through associating UEs with a proper PoA that has enough capacity and that which is expected to provide a high enough signal strength.

When either $\tau_c$ is exceeded, or $\tau_s$ of a session drops below the threshold, the handover operation first broadcasts its status by sharing its context-aware information, and discovers a set of neighboring MEC (edge) servers of the one or more neighboring MEC servers 116A-116N by requesting context-aware information of corresponding PoAs in the vicinity. The operation then lists video sessions in ascending order according to their signal strengths (that is, the session with the lowest signal strength comes to the top of the list). The handover operation is marked by the one or more neighboring MEC servers 116A-116N if there is another PoA (with sufficient capacity) that is expected to provide a higher signal strength for the session. The marked operation is executed for all sessions that fall below the signal strength threshold. In case the capacity is still expected to exceed the $\tau_c$ after the aforementioned executions, handover marking continues until either the capacity falls below the threshold, or the list is empty. After either the $\tau_c$ drops below the threshold, or the list is empty, handover operations are initiated at once for the next chunk transmissions of sessions.

In case the handover process is decided to be initiated for a session, the pre-fetched chunks of the next round(s) at the central MEC server 108 are first forwarded to a neighboring MEC server of the one or more neighboring MEC servers 116A-116N that the session will be connected to, before the handover is initiated. This operation allows the session to consume the chunks that are already present in the user's buffer while the handover process is in progress, and to pre-fetch the chunks of the next round(s) quickly from a new MEC (edge) server after the handover.

Load Balancing via Cooperative Pre-fetching: The handover operation does not always solve the problem as there may be UEs having weak signal strengths but are quite distant to other PoAs to associate with. Congestion that may occur in the network at any time cannot also be solved by the handover process. Furthermore, the handover operation itself may also damage load balancing in case most of the UEs are gathered around just one PoA. The issues may be resolved utilizing a cooperative pre-fetching operation among the one or more neighboring MEC servers 116A-116N. For instance, a session having less throughput due to congestion (congestion may result in sessions to decrease their bitrates due to lower average throughput values obtained in each round than the required throughput for their current bitrates) is required to decrease its bitrate since no local approach, or the handover procedure can effectively solve the problem itself. However, the session may be supported by the one or more neighboring MEC servers 116A-116N through parallel pre-fetching and the throughput required for the session can be maintained without decreasing the bitrate of the session.

Significant latency reduction may be achieved transferring pre-fetched chunks in the following rounds to the user end (UE) directly from the central MEC server 108. However, if the backhaul throughput at the cloud-to-edge path is less than the required throughput for the selected bitrate for a long time, there will be no chunks left in the user's buffer after a while and re-buffering will start since downloading chunks will take more time than their playing duration (See Eq. 6). In this case, pre-fetching through a single edge server may not work in the long term. However, collaborative pre-fetching over multiple edges can solve this problem by ensuring that the total downlink speed of edges is not less than the video play speed, and hence prevent video sessions from decreasing their current video bitrates even if the cloud-to-edge path cannot always sustain the required bandwidth.

To prevent decreasing the QoE levels of video sessions, the cooperative pre-fetching operation decides how many neighboring edge (MEC) servers of the one or more neighboring MEC servers 116A-116N are required to make the average throughput ($\theta_{avg}$) obtained in each round bigger than the throughput required ($\theta_{avg}(b_k)$) for the bitrate selected per video session. The collaborative/cooperative pre-fetching operation is further described in conjunction with FIG. 4.

The network-assisted smart/proactive QoE maximizer module 218 may comprise suitable logic, interfaces, and/or code that may be configured to utilize both local and global parameters along with context-aware channel status through information broadcasting based on early detection and timely operation. In this way, potential channel fluctuations and the possibility of an increase/decrease in performance are detected earlier than they actually occur.

The network-assisted smart/proactive QoE maximizer module 218 is configured to maximize the sum of the QoE values of all sessions, connected to the same MEC server, throughout the entire video play duration, by making use of the aforementioned local and global adaptations. All local adaptations are applied to each node/session and controlled separately by each single MEC server and is therefore easy to use/implement and do not increase the complexity of the algorithm as they are initiated sequentially.

Specifically, TCP splitting is applied in a straightforward manner to each node that enters the network in the beginning of the algorithm. In this way, a standard TCP session, which supports networks/users with congestion and flow control, is initiated per user for the wired communication between the cloud and an MEC server, whereas data transmission in a wireless environment of mobile users is initiated via MEC servers that have context-aware channel/radio information. Information regarding each TCP session, and its related UE-side and medium-side parameters that may include, but are not limited to, bitrate selected, maximum achievable bitrate, average throughput, required throughput per bitrate, estimated buffer size, initial play-out delay, estimated re-buffering ratio, user mobility, number of active sessions, estimated latency, and congestion index, are kept in a database and then, QoE modeling per session is created dynamically per chunk until the end of each video session, considering the impact of video bitrate, initial play-out delay, re-buffering and video quality switching.

The window size adaptation is also applied to each node that enters the network. Therefore, each session has its own congestion window size to have a better or enough throughput opportunity. In this way, sessions that have higher throughput than required have a lower window size, and sessions that have lower throughput than required (due to congestion or packet loss) have a higher window size. This results in a fair and efficient distribution of the channel and causes every session to have enough bandwidth for their bitrate.

Adaptive pre-fetching is also controlled based on the capacity of an MEC server, and the capacity requirements per active session. The MEC server basically pre-fetches as many chunks as possible up until a predefined threshold, or as long as it has enough capacity to efficiently utilize the available bandwidth. In case the capacity of the MEC server reaches the threshold due to excessive number of users/sessions, or high number of chunk pre-fetching, the pre-fetching operation is continued to be performed in each round, keeping the chunk consumption rate and the chunk pre-fetching rate equal or close to each other (by pre-fetching a chunk from the cloud for each chunk requested by the UE). Thus, the adaptive pre-fetching operation fully utilizes every bit of the channel bandwidth before it gets fully loaded. In this way, in case the channel is highly loaded, instead of lowering the bitrate of sessions, the sessions may be fed with pre-fetched high bitrate packets, thus achieving QoE preservation/maximization for a longer period.

The policy-based local approaches are easy to compute and perform. However, in cases of congestion, sessions with low RSSI, or very dense networks, these local approaches cannot maintain the maximum achievable QoE values of sessions for a long time. In order to detect whether such a situation has occurred, an early diagnosis is provided by constantly monitoring the wired/wireless medium.

As long as each MEC server provides its users with the highest bitrate, the local optimization approach/algorithm continues to work, without the need for a global optimization. In the event that an MEC server is unable (due to congestion, low RSSI or highly loaded capacity) to bring all its users to the highest possible bitrate state (although each session's link quality matches the highest bitrate state), global optimization approaches (proactive handover and cooperative pre-fetching) are performed, aiming to obtain help from neighboring edges and thus supply QoE maximization. A neighboring MEC server of the one or more neighboring MEC servers 116A-116N broadcasts its own status to other neighboring MEC servers and waits for other neighboring MEC servers to broadcast their status. Subsequently, the one or more neighboring MEC servers 116A-116N run the same global optimization algorithm as they all have the same arguments as inputs. Thus, the next chunk transmissions are performed according to the result of the algorithm output.

Handover and cooperative pre-fetching approaches are complex operations and may take too long to find the optimal solution, yet these approaches require real-time adaptation not to decrease the QoE. Due to excessive number of sessions, mobility of sessions, limited capacity, collisions and packet loss, MEC servers have to decide rapidly and optimally either to hand some sessions over to other MEC servers, or to pre-fetch chunks in parallel by getting help from neighboring PoAs, or both to balance the load, and increase the overall throughput.

Considering there are m PoAs (MEC servers), n sessions per PoA, k bitrates per session, and C capacities per PoA, the joint optimization of load balancing and QoE belongs to the class of non-deterministic polynomial-time (NP)-hard problems, as it involves the maximization of the sum of the QoE values of all users throughout the entire video play duration.

In order to achieve the highest (or near the highest) achievable QoE considering all MEC servers and their associated UEs, signal strength should not be the main single parameter. For instance, if a session with low RSSI handovers to another PoA that is highly loaded, its QoE value may even decrease more, and additionally, the handover operation may also cause other stations in that PoA to decrease their bitrates, which eventually results in lower overall QoE value. Therefore, each PoA and session is monitored dynamically, and it is decided exactly which sessions to handover among base stations, and which chunks are to be pre-fetched from neighboring MEC servers at once in each execution to achieve the highest (or near the highest) total QoE value during the entire video play duration. The network-assisted smart and proactive QoE maximization approach is further described in conjunction with FIG. 5A and FIG. 5B.

Further, the QoE maximizer module 212 is configured to increase the QoE levels of the one or more video sessions by adjusting a bitrate of each video session of the one or more video sessions depending on a channel condition of at least one neighboring MEC server of the one or more neighboring MEC servers 116A-116N.

Figure 3:
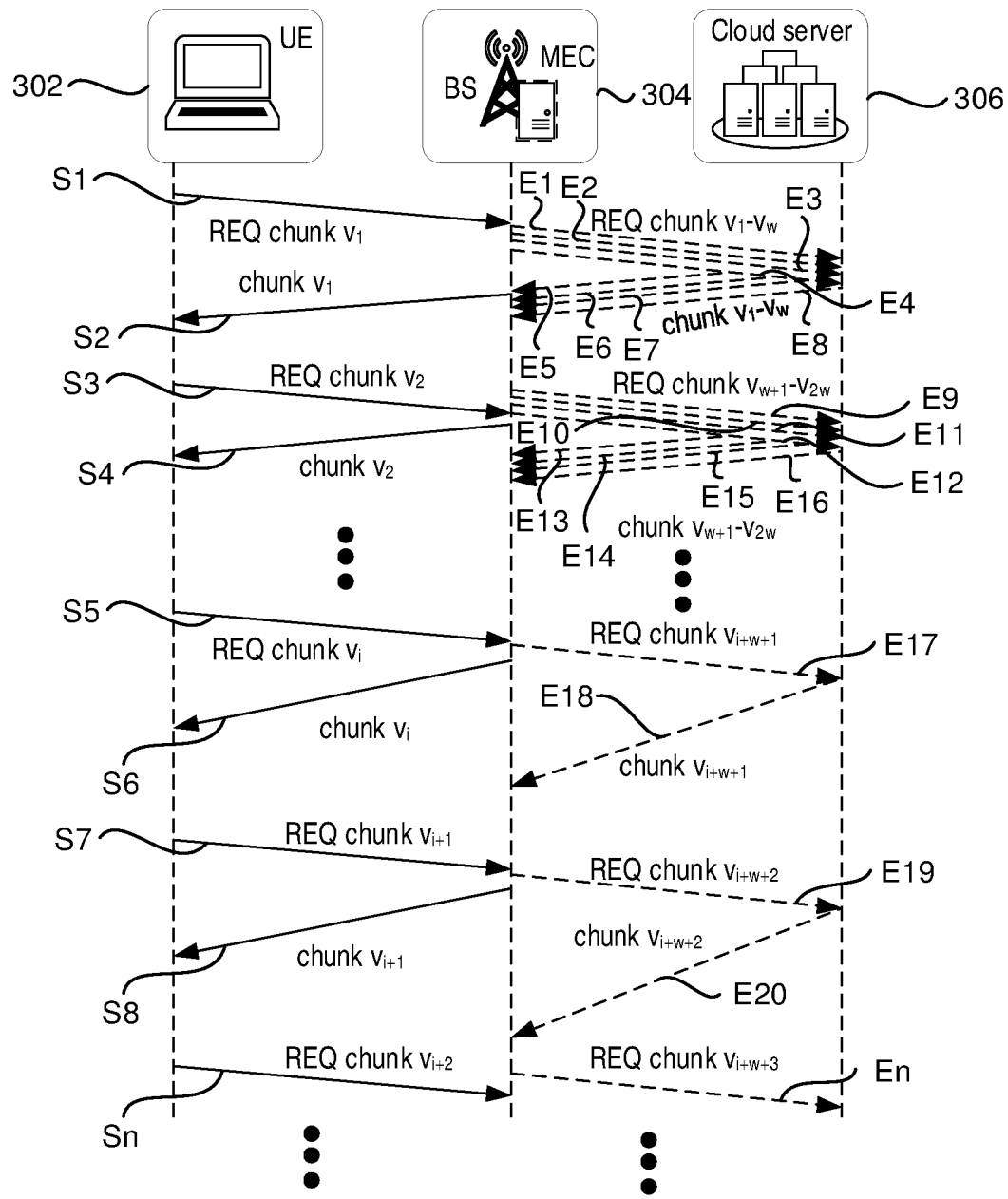
FIG. 3 is a flow diagram that illustrates an adaptive pre-fetching operation through a single edge (MEC) server in accordance with an exemplary embodiment of the disclosure.

FIG. 3 is a flow diagram that illustrates an adaptive pre-fetching operation through a single edge (MEC) server in accordance with an exemplary embodiment of the disclosure. Referring to FIG. 3, there is shown a UE 302, a central edge (MEC) server 304, a cloud server 306, solid lines indicating UE-initiated requests S1-Sn and dashed lines indicating edge-initiated prefetching requests E1-En. FIG. 3 demonstrates the procedures taken by the central edge (MEC) server 304 (the server the UE 302 is connected to) in case the $\theta_{avg} \geq \theta_{req}(b_k)$ (that is, average throughput rate is bigger than required throughput for the bitrate k) is achieved through a single edge.

Referring to FIG. 3, REQ chunk $v_1$, REQ chunk $v_2$, ... REQ chunk $v_{i+1}$ etc., are the video packets (chunks) requested by the UE 302 from the central edge (MEC) server 304. REQ chunk $v_{1-w}$–REQ chunk $v_{i+w+3}$, etc., are the number of chunks requested by the central edge (MEC) server 304 from the cloud server 306. The UE 302 requests the video packets (chunks) one by one based on the packet consumption rate (video play), and the central edge (MEC) server 304 tries to cache more video packets than what the UE 302 needs in each period/round (windows). Therefore, most of the video packets are cached at the central edge (MEC) server 304 in advance and are ready to be pre-fetched to the UE 302. In this regard, end-to-end communication latency decreases considerably due to the fact that most of the video packets (chunks) are directly prefetched from the central edge (MEC) server 304 to the UE 302, where the distance between the UE 302 and the central edge (MEC) server 304 is very less, compared to the distance between the UE 302 and the cloud server 306.

While the chunks already cached at the central edge (MEC) server 304 are directly transmitted to the UE 302 after a request from the UE 302, chunks to be needed in the next round(s) are also pre-fetched from the cloud server 306 using the adaptive pre-fetching operation. This operation hence prevents/limits possible re-buffering problem setting the number of pre-fetched chunks based on the number of chunks requested per round.

Figure 4:
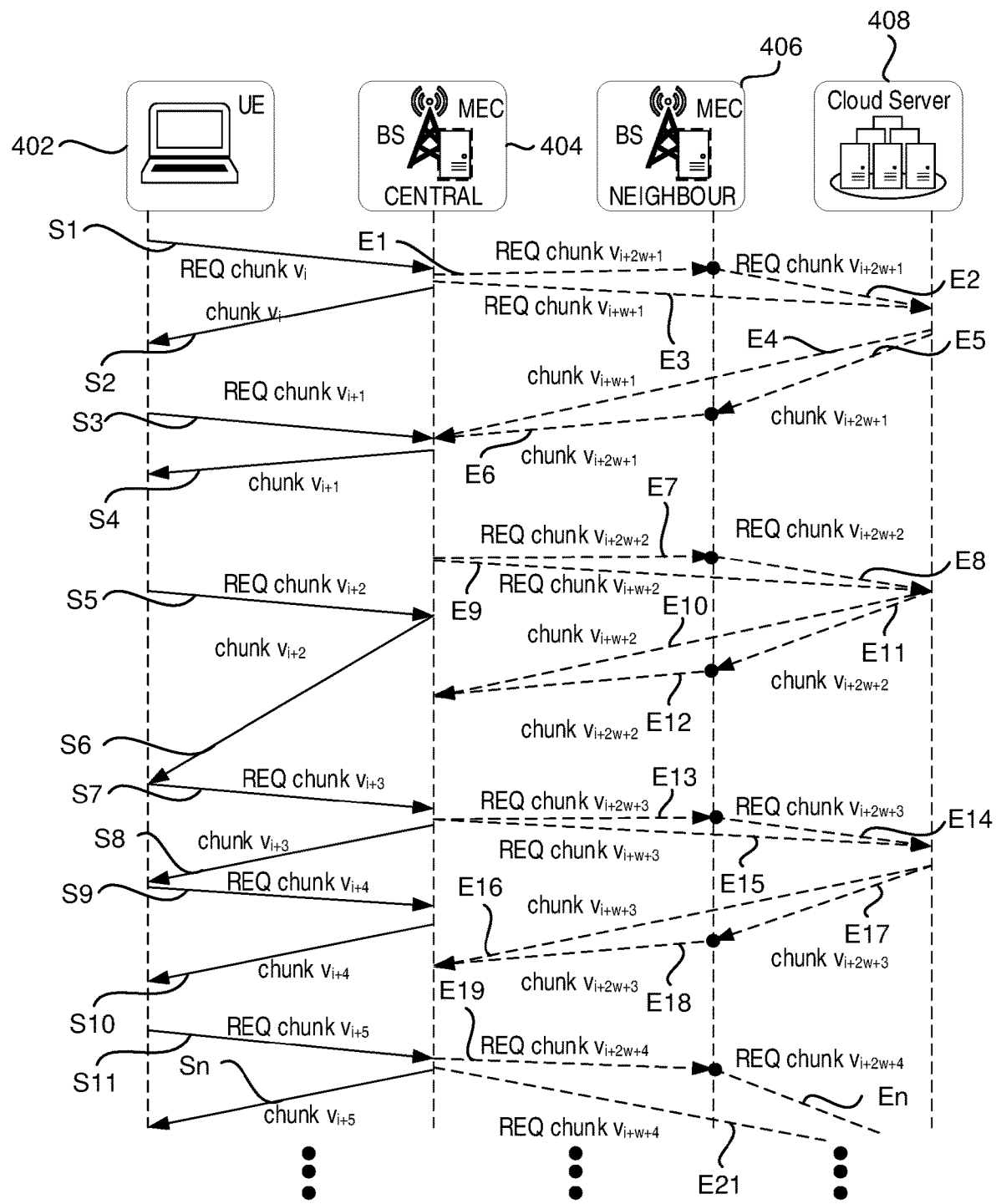
FIG. 4 is a flow diagram that illustrates a QoE-aware collaborative pre-fetching operation in accordance with an exemplary embodiment of the disclosure.

FIG. 4 is a flow diagram that illustrates a QoE-aware collaborative pre-fetching operation in accordance with an exemplary embodiment of the disclosure. Referring to FIG. 4, there is shown a UE 402, a central edge (MEC) server 404, neighboring edge (MEC) server(s) 406, a cloud server 408, solid lines indicating UE-initiated requests S1-Sn and dashed lines indicating edge-initiated prefetching requests E1-En.

Referring to FIG. 4, REQ chunk $v_1$, REQ chunk $v_2$, ... REQ chunk $v_{i+1}$ etc., are the video packets (chunks) requested by the UE 402 from the central edge (MEC) server 404. REQ chunk $v_{i+2w+1}$–REQ chunk $v_{i+2w+4}$, etc., are the number of chunks requested by the central edge (MEC) server 404 to the neighboring edge (MEC) server(s) 406 and from the neighboring edge (MEC) server(s) 406 to the cloud server 408.

If the central edge (MEC) server 404 alone is not enough to cache the next couple of chunks, that the UE 402 will require eventually, by itself due to being overloaded, then the central edge (MEC) server 404 requests help from the neighboring edge (MEC) server(s) 406 and they work together to cache the prospective chunks, once again to minimize the end-to-end latency since most of the chunks will be directly prefetched from the neighboring edge (MEC) server(s) 406 to the UE 402, where the distance between the UE 402 and the neighboring edge (MEC) server(s) 406 is very less, compared to the distance between the UE 402 and the cloud server 408.

FIG. 4 demonstrates the procedures taken by both the central edge (MEC) server 404 and other collaborative neighboring edge (MEC) server(s) 406 to make $\theta_{avg} \geq \theta_{req}$ ($b_k$) (that is, the average throughput obtained in each round bigger than the throughput required for the bitrate k selected per video session). As in the adaptive pre-fetching scenario, while the chunks already cached at the neighboring edge (MEC) server(s) 406 are directly transmitted to the UE 402 after a request from the UE 402, chunks to be needed in the next round(s) are also prefetched from the cloud server 408 using the collaborative pre-fetching operation. This operation therefore prevents/limits possible re-buffering problem by setting the number of pre-fetched chunks based on the number of chunks requested per round. In case the backhaul throughput of the cloud-to-edge path is slower than the session's chunk consumption rate, the pre-fetching process is performed with the assistance from other neighboring edge (MEC) server(s) 406.

Figure 5A:
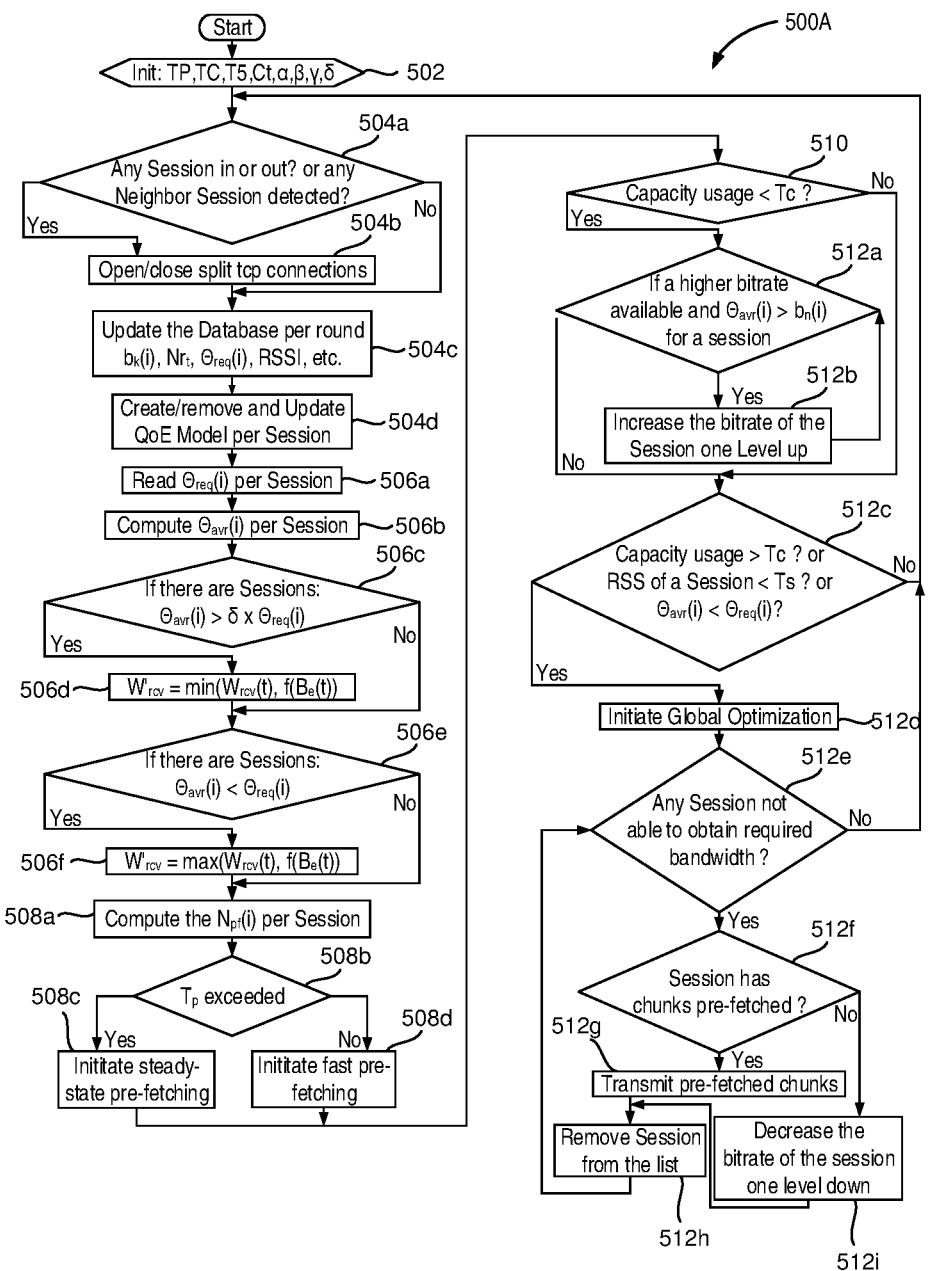
FIG. 5A and FIG. 5B collectively is a flowchart that illustrates a simplified pseudo-code of a network-assisted smart and proactive QoE maximization operation which uses both local and global parameters along with context-aware channel status in accordance with an exemplary embodiment of the disclosure.
Figure 5B:
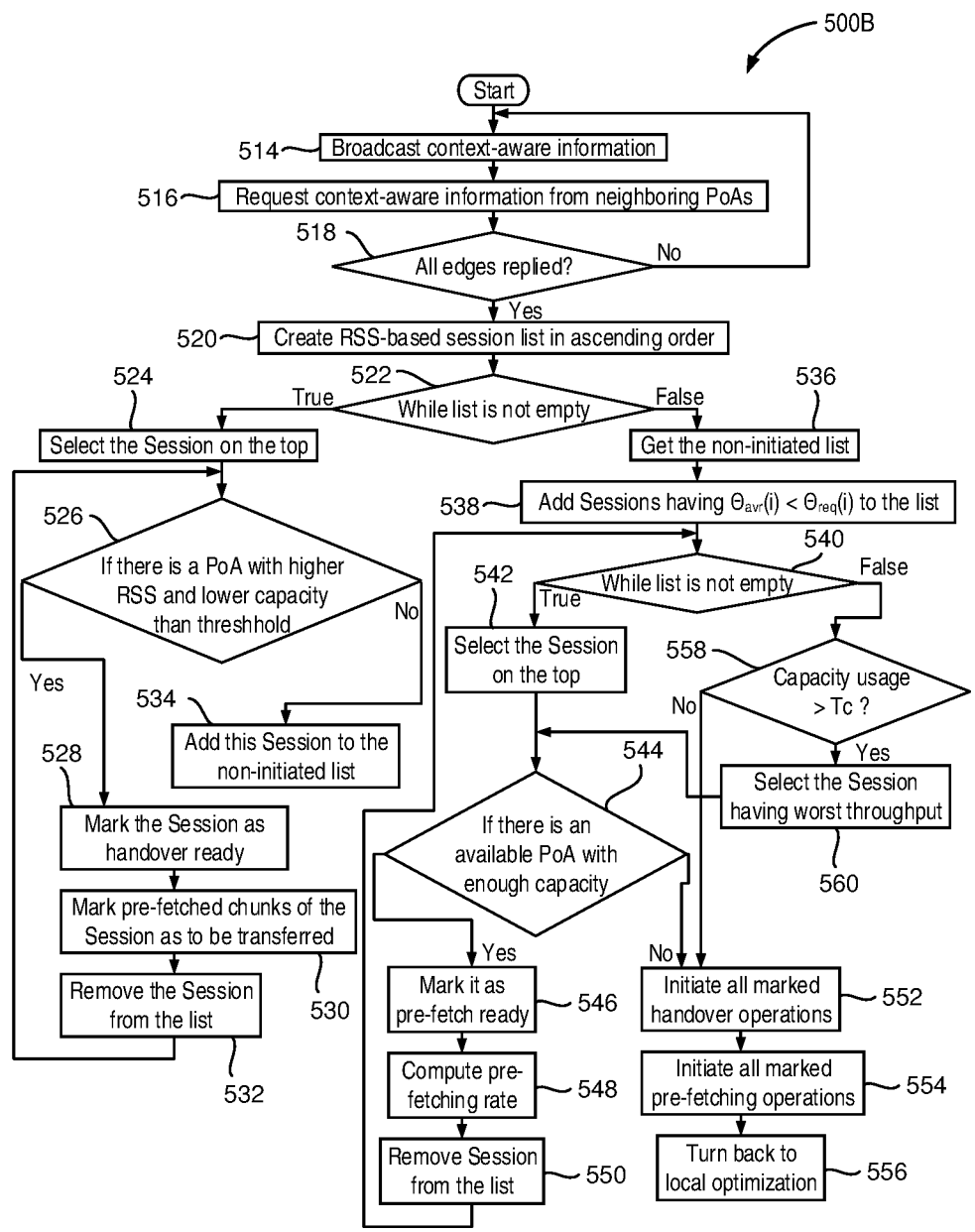

FIG. 5A and FIG. 5B collectively is a flowchart that illustrates a simplified pseudo-code of a network-assisted smart and proactive QoE maximization operation which uses both local and global parameters along with context-aware channel status in accordance with an exemplary embodiment of the disclosure. In order to provide sessions with the highest possible QoE levels, the operation performs local optimizations (FIG. 5A) and global optimizations (FIG. 5B), performing TCP splitting, window size adaptation, adaptive and collaborative pre-fetching and handover operations.

Referring to FIG. 5A, there is shown a flowchart 500A depicting local optimizations performed by a single MEC server.

At 502, the following parameters are initialized: $T_p$, $T_c$, $T_s$, $C_t$, $\alpha$, $\beta$, $\gamma$, $\delta$, where $T_p$ is the processing power threshold of the MEC server, $T_c$ is the capacity usage threshold of the MEC server, $T_s$ is the signal strength threshold of a session, wherein these thresholds are either predefined or calculated dynamically based on the scenario, $C_t$ is the available capacity of the MEC server in a time, and $\alpha$, $\beta$, $\gamma$, $\delta$ are static values (weights) assigned to $R_r$, $f_s$ and $g_p$, respectively to find the QoE.

QoE modeling is then performed per new session according to the bitrate selected by a UE. In this way, the QoE level, initial bitrate, and the amount of throughput required for the selected bitrate per session is determined. The QoE modeling includes the following operations:

At 504a, it is detected if any sessions have been entered to the medium or if any neighboring sessions are present.

At 504b, split TCP connections are either opened or closed. A new TCP split connection is first opened per session that has been entered to the medium.

At 504c, a database is updated per round with the following parameters: $b_k(i)$, $Nr_t$, $\theta_{req}(i)$, RSSI, where $b_k(i)$ is the bitrate for the packet $v_i$, $Nr_t$ is the number of packets received, $\theta_{req}(i)$ is the required throughput for the chunk $v_i$, and RSSI is the received signal strength indicator for the session.

At 504d, QoE models are created/removed and updated per session.

Following the QoE modeling, window size adaptation is performed which includes the following operations:

At 506a, the operation reads the amount of throughput ($\theta_{req}(i)$) required per session, and at 506b, the operation computes the average throughput values $\theta_{avg}(i)$ obtained in the previous round, and initializes the window size adaptation.

At 506c, it is determined if there are sessions with $\theta_{avg}(i) > \delta \times \theta_{req}(i)$. If yes, at 506d, the window size adaptation is given by, $$W'_{rcv} = \min(W_{rcv}(t), f(B_e(t))) \quad (11)$$

where $W'_{rcv}$ is the advertised empty window size, $W_{rcv}(t)$ is the old empty window size and $f(B_e(t))$ is the estimated window size for video sessions.

Else, at 506e, it is determined if there are sessions with $\theta_{avg}(i) < \theta_{req}(i)$. If yes, at 506f, the window size adaptation is given by, $$W'_{rcv} = \max(W_{rcv}(t), f(B_e(t))) \quad (12)$$

The adaptive pre-fetching operation is then initiated, and the expected number of chunks to be pre-fetched in the next round is computed. Thus, requested video chunks are transmitted to the UE at low latency in case they are already pre-fetched at edge servers. In case they are not pre-fetched, the operation forwards the request to the cloud server 104, retrieves requested chunks and transmits them to the UE. The adaptive pre-fetching operation includes the following processes:

At 508a, the operation computes the $N_{pf}(i)$ per session, where $N_{pf}(i)$ is the expected number of chunks to be pre-fetched in a round length (W) by the edge server.

At 508b, it is determined if $T_p$ has exceeded a threshold. If yes, at 508c, a steady-state pre-fetching operation is initiated. Else, at 508d, a fast pre-fetching operation is initiated.

At 510, it is checked whether the capacity usage of the edge server is lower than the threshold $\tau_c$. The condition is checked to increase bitrates of sessions using a lower bitrate than what the network can handle, making use of the ABR adaptation which includes the following operations:

At 512a, if a higher bitrate is available and $\theta_{avg}(i) > b_k(i)$ for a session, at 512b, the bitrate of the session is increased one level up.

At 512c, in case congestion, capacity or signal strength related issues exist, that is, if capacity usage is greater than threshold $\tau_c$, or if RSS of a session is less than threshold $\tau_s$, or if $\theta_{avg}(i)$ is less than $\theta_{req}(i)$, at 512d, the global optimization approaches are initiated.

At 512e, if any session is not able to obtain required bandwidth, at 512f, it is checked if the session has pre-fetched chunks. If the session has chunks that have already been pre-fetched, at 512g, the pre-fetched chunks are transmitted. At 512h, the session is then removed from the list. If the session does not have pre-fetched chunks, at 512i, the bitrate of the session is decreased one level down and the session is then removed from the list.

Referring to FIG. 5B, there is shown a flowchart 500B depicting global optimizations performed by multiple neighboring MEC servers.

At 514, context-aware information is broadcast. At 516, context-aware information is requested from neighboring edges or PoAs.

At 518, it is determined if all the neighboring edges have replies with the context-aware information.

If all the neighboring edges have replied with the context-aware information, a handover operation is initiated.

At 520, an RSS-based session list is created in ascending order. At 522, it is determined if the RSS-based session list is empty or not. While the list is not empty, at 524, the session on the top of the list is selected.

At 526, it is determined if there is PoA with higher RSS and lower capacity than a threshold. Upon determining the presence of such a PoA, at 528, the session selected from the list is marked as handover ready. At 530, the prefetched chunks of the session to be transferred are marked and at 532, the session is removed from the list.

On the other hand, if it is determined that there is no PoA with higher RSS and lower capacity than a threshold, at 534, the selected session is added to non-initiated list.

In case the RSS-based selection list is empty, a cooperative pre-fetching operation is initiated.

At 536, the non-initiated list of sessions is obtained. At 538, the list of sessions having $\theta_{avg}(i)$ less than $\theta_{req}(i)$ are added to the list.

At 540, it is determined if the list is empty or not. While the list is not empty, at 542, the session on the top of the list is selected.

At 544, it is determined if there is an available PoA with enough capacity. Upon determining the presence of such a PoA, at 546, the PoA is marked as prefetch ready. At 548, a prefetching rate is computed and at 550, the session is removed from the list and the control transfers to 540.

On the other hand, if it is determined that there is no available PoA with enough capacity, at 552 and 554, all marked handover and prefetching operation are initiated respectively. At 556, local optimizations are then started.

In case the RSS-based selection list is empty, at 558, it is checked whether the capacity usage of the edge server is greater than the threshold $\tau_c$. In case the capacity usage is greater than $\tau_c$, at 560, the session having the worst throughput is selected and the control transfers to 544. In case the capacity usage is less than $\tau_c$, operations 552, 554 and 556 are performed.

In this context, parameters to be taken as input to the global optimization algorithm to be broadcast at once, may include, but are not limited to, the following: (i) RSSI values for sessions with and without service (in order to understand which device can be handed over to which MEC), (ii) empty and utilized capacity of each MEC server, (iii) capacity requirements per session (bitrates per session), so that the capacity requirement per second of each MEC can be determined in the no pre-fetching scenario, (iv) number of pre-fetched packets in each MEC and in each session, (v) number of active sessions per MEC, (vi) average background throughput per MEC, (vi) remaining video play duration per session (duration of packages that have not yet received ACK), and (vii) estimated buffer occupancy time per session (total packet size sent so far is calculated with the first and last received ACKs, and then, loaded, not played yet, video time is calculated in the user's buffer).

Accordingly, the information that the algorithm presents to the MEC servers as output include the following: (i) information on which session is assigned to which MEC server, (ii) information of which MEC server will perform cooperative pre-fetching for which session, and (iii) cooperative pre-fetching speed for sessions (may also be zero).

The global optimization is initiated in case of low RSSI (only when certain sessions are affected), capacity of the server exceeding the capacity threshold, or congestion. If there is another MEC server that will provide throughput increase for session(s) having weak RSSI, the session(s) are marked as handover ready, as long as it does not harm the QoE values of other sessions, without decreasing bitrates of the sessions. In case there are no other MEC servers available to be handed over, load balancing via cooperative pre-fetching is performed if capacity of another MEC is available to do so. In case any adaptation is not available, or adaptations performed through global optimization does not solve the problem, the operation allows some of the sessions to consume their pre-fetching packages, if there are any, starting from the session having the most pre-fetched chunks. If this procedure does not also solve the issue, the bitrate of a session having less throughput than required is lowered, starting from the session that has the least time remaining first, using the ABR within local optimization.

In case of a possible congestion or loss of RSS, information is broadcast early, preliminary calculations are made, and then the scenario/operation time is determined collectively. In this way, operations are performed automatically for the next chunks. Further, this operation does not utilize any packet sniffer tool. Instead, it monitors only the throughput ratio upon arrivals of ACK packets and whether the difference between consumption and delivery is decreased below a certain threshold. If it is reduced below the threshold, pre-fetched data in the edge server(s) is transmitted to the user in bulk and hence, possible re-buffering may be avoided. Further, this operation runs as long as video sessions are in progress and allows users to watch videos with the highest QoE levels during the entire video play times as much as possible by preserving/increasing their initially selected bitrates and preventing the buffer from being emptied.

Figure 6:
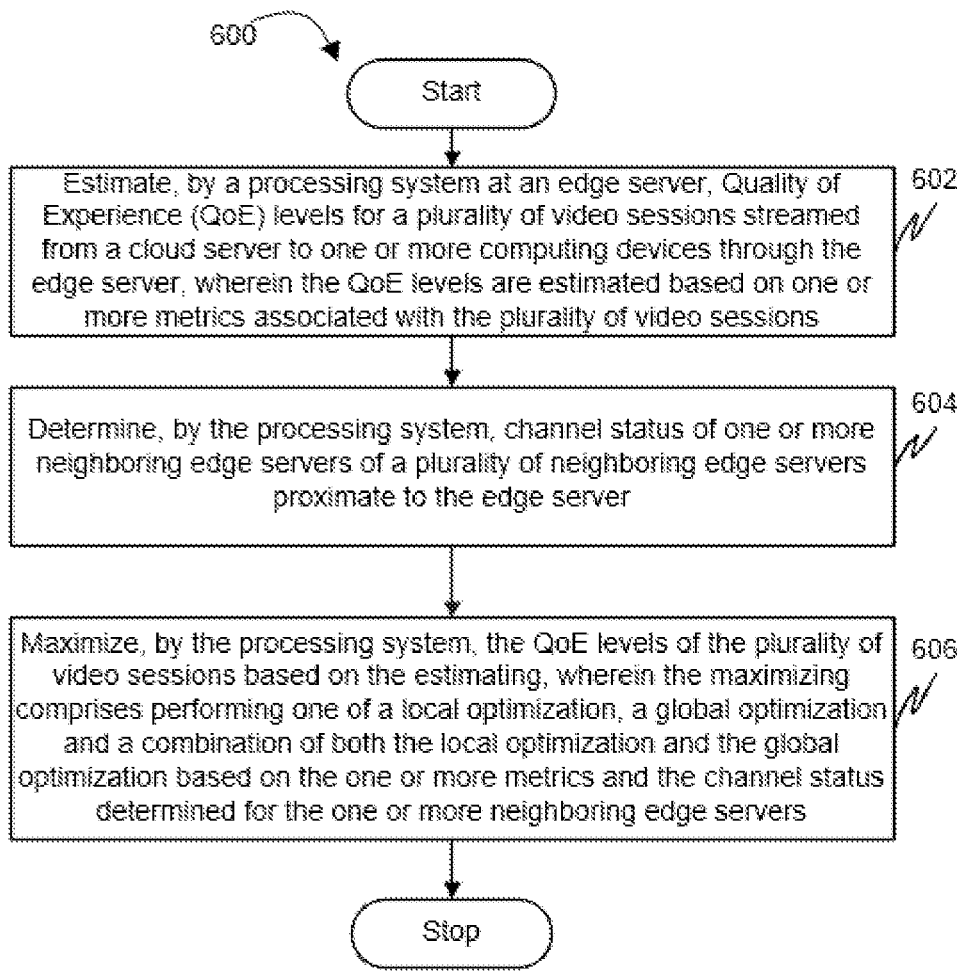
FIG. 6 is a flowchart that illustrates a method for optimizing QoE levels for video streaming over wireless/cellular networks in accordance with an exemplary embodiment of the disclosure.

FIG. 6 is a flowchart that illustrates a method for optimizing QoE levels for video streaming over wireless/cellular networks in accordance with an exemplary embodiment of the disclosure. Referring to FIG. 6, there is shown a flowchart 600 for optimizing QoE levels for video streaming over wireless/cellular networks using the QoE optimizer application 112.

At 602, estimate, by a processing system at an edge server, Quality of Experience (QoE) levels for a plurality of video sessions streamed from a cloud server to one or more computing devices through the edge server, wherein the QoE levels are estimated based on one or more metrics associated with the plurality of video sessions. The QoE level estimation module 208 is configured to estimate QoE levels for a plurality of video sessions streamed from the cloud server 104 to the one or more computing devices 102A-102N through the central MEC (edge) server 108. The QoE levels are estimated based on one or more metrics associated with the plurality of video sessions. The one or more metrics may include, but are not limited to, a video bitrate, an initial play-out delay, a re-buffering time, and a video quality switching.

At 604, determine, by the processing system, channel status of one or more neighboring edge servers of a plurality of neighboring edge servers proximate to the edge server. The channel status determination module 210 is configured to determine channel status of the one or more neighboring MEC (edge) servers 116A-116N proximate to the central MEC server 108.

At 606, maximize, by the processing system, the QoE levels of the plurality of video sessions based on the estimating, wherein the maximizing comprises performing one of a local optimization, a global optimization and a combination of both the local optimization and the global optimization based on the one or more metrics and the channel status determined for the one or more neighboring edge servers. The QoE maximizer module 212 is configured to maximize the QoE levels of the plurality of video sessions based on estimating QoE levels for the plurality of video sessions, by performing a local optimization using the local optimization module 214, a global optimization using the global optimization module 216 and a combination of both the local optimization and the global optimization using the network-assisted smart/proactive QoE maximizer module 218, based on the one or more metrics and the channel status determined for the one or more neighboring MEC servers 116A-116N. Local optimization is performed by only the central MEC server 108 and global optimization is performed by both the central MEC server 108 and the one or more neighboring MEC servers 116A-116N.

The present disclosure is advantageous in that it provides a network-assisted QoE-based smart and proactive video streaming framework to be deployed at MEC servers. The framework and the associated algorithms aim to provide each UE with the highest possible QoE value during the entire video session through local and global optimizations among edges.

The system of the present disclosure uses the DASH protocol with the assistance of MEC, with its ability to deploy application services, cache and enable delivery/computation offloading at the network edge, and also exploits users' QoEs and provides reduced backhaul data traffic for Internet Service Providers (ISPs).

The system of the present disclosure implements context-aware smart operations and provides a better perceived QoE for users. In this regard, Mobile Network Operators (MNOs) can adjust their radio resources with different rates according to user-specific issues, such as fairness or error, TCP contention window sizes may be adjusted according to the available buffer space of video sessions at the UE-side, CSPs can adjust additional caching, pre-fetching or task offloading policies depending on data repetition or CPU/memory utilization. Since QoE level cannot be estimated utilizing only the data from the UE itself, and there is no QoE-centric feedback policy in a DASH protocol, it is best to run agents/applications on MEC servers located at the edges that perform the aforementioned smart operations to maximize the QoE levels of ongoing video sessions.

A system 100 of the present disclosure comprises a QoE optimizer application 112 which further comprises a memory 202 and a processor 204 communicatively coupled to the memory 202. The processor 204 is configured to estimate, at an edge server 108, QoE levels for a plurality of video sessions streamed from a cloud server 104 to one or more computing devices 102A-102N through the edge server 108, wherein the QoE levels are estimated based on one or more metrics associated with the plurality of video sessions. The processor 204 is further configured to determine channel status of one or more neighboring edge servers 116A-116N proximate to the edge server 108, and maximize the QoE levels of the plurality of video sessions based on the estimating, by performing one of a local optimization, a global optimization and a combination of both the local optimization and the global optimization based on the one or more metrics and the channel status determined for the one or more neighboring edge servers 116A-116N. The local optimization is performed by only the edge server 108 and the global optimization is performed by the edge server and the one or more neighboring edge servers 116A-116N.

The processor 204 is further configured to perform Transmission Control Protocol (TCP) splitting by adapting different TCP window sizes for each video session of the plurality of video sessions based on a bitrate value required for each video session. The processor 204 is configured to perform an explicit window size adaptation operation over split TCP connections to achieve sufficient throughput for each video session of the plurality of video sessions. The processor 204 is further configured to manage at the edge server 108 in real-time, buffer occupancy levels of the one or more computing devices 102A-102N, modify buffer size values advertised by the one or more computing devices 102A-102N and transmit the buffer size values that were modified.

The processor 204 is further configured to adaptively pre-fetch and transfer one or more chunks associated with the plurality of video sessions already cached at the central MEC server 108 to a computing device of the one or more computing devices 102A-102N based on a video consumption rate of each video session of the plurality of video sessions and/or a buffer capacity at the central MEC server 108 reaching a certain threshold, to fully utilize front-end throughput between the central MEC server 108 and the computing device.

The processor 204 is further configured to perform Adaptive Bitrate (ABR) adaptation by detecting in real-time bandwidth and processing capacities of a computing device of the one or more computing devices 102A-102N and adjusting a quality of video streams associated with the plurality of video sessions based on the detecting.

The processor 204 is configured to pre-fetch and cache, at the central MEC server 108, one or more chunks associated with the plurality of video sessions required for the one or more computing devices and transfer the one or more chunks from the central MEC server 108 directly to the one or more computing devices 102A-102N when needed.

The processor 204 is configured to perform collaborative pre-fetching using one or more neighboring edge servers 116A-116N, if the central MEC server 108 is not able to pre-fetch the one or more chunks due to a highly loaded capacity of the central MEC server 108, wherein the one or more neighboring edge servers 116A-116N pre-fetch the one or more chunks for the plurality of video sessions that are not connected to the one or more neighboring edge servers 116A-116N and transfer the one or more chunks to one or more other neighboring edge servers to which the plurality of video sessions are connected.

The processor 204 is further configured to perform a handover operation for one or more video sessions of the plurality of video sessions having weak signal strengths, by enabling the one or more video sessions to connect to at least one neighboring edge server having a higher signal strength.

The processor 204 is further configured to increase QoE levels of the one or more video sessions by adjusting a bitrate of each video session of the one or more video sessions depending on a channel condition of the at least one neighboring edge server.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method, comprising:
    estimating, by a processing system at an edge server, Quality of Experience (QoE) levels for a plurality of video sessions streamed from a cloud server to one or more computing devices through the edge server,
        wherein the QoE levels are estimated based on one or more metrics associated with the plurality of video sessions;
    determining, by the processing system, channel status of one or more neighboring edge servers of a plurality of neighboring edge servers proximate to the edge server;
    maximizing, by the processing system, the QoE levels of the plurality of video sessions based on the estimating,
        wherein the maximizing comprises performing one of a local optimization, a global optimization and a combination of both the local optimization and the global optimization based on the one or more metrics and the channel status determined for the one or more neighboring edge servers,
        wherein the local optimization is performed by only the edge server and the global optimization is performed by the edge server and the one or more neighboring edge servers; and
    performing, by the processing system, collaborative pre-fetching for the global optimization using the one or more neighboring edge servers based on inability of the edge server to pre-fetch one or more chunks due to a highly loaded capacity of the edge server,
        wherein the one or more chunks are pre-fetched by the one or more neighboring edge servers for the plurality of video sessions that are not connected to the one or more neighboring edge servers, and
        wherein the one or more chunks are transferred to the edge server to which the plurality of video sessions is connected.

2. The method of claim 1, wherein the edge server and the plurality of neighboring edge servers are Multi-access Edge Computing (MEC) servers, each deployed at a point-of-attachment (PoA).

3. The method of claim 1, wherein the one or more metrics comprise at least one of a video bitrate, an initial play-out delay, a re-buffering time, and a video quality switching.

4. The method of claim 1, wherein performing the local optimization comprises, performing, by the processing system, Transmission Control Protocol (TCP) splitting by adapting different TCP window sizes for each video session of the plurality of video sessions based on a bitrate value required for each video session.

5. The method of claim 4, further comprising performing, by the processing system, an explicit window size adaptation operation over split TCP connections to achieve sufficient throughput for each video session of the plurality of video sessions,
    wherein the explicit window size adaptation operation further comprises:
        managing at the edge server in real-time, buffer occupancy levels of the one or more computing devices;
        modifying buffer size values advertised by the one or more computing devices; and
    transmitting the buffer size values that were modified.

6. The method of claim 1, wherein performing the local optimization comprises adaptively pre-fetching and transferring, by the processing system, the one or more chunks associated with the plurality of video sessions already cached at the edge server to a computing device of the one or more computing devices based on a video consumption rate of each video session of the plurality of video sessions and/or a buffer capacity at the edge server reaching a certain threshold, to fully utilize front-end throughput between the edge server and the computing device.

7. The method of claim 1, wherein performing the local optimization comprises performing, by the processing system, Adaptive Bitrate (ABR) adaptation by detecting in real-time bandwidth and processing capacities of a computing device of the one or more computing devices and adjusting a quality of video streams associated with the plurality of video sessions based on the detecting.

8. The method of claim 1, wherein performing the global optimization comprises pre-fetching and caching, by the processing system at the edge server, the one or more chunks associated with the plurality of video sessions required for the one or more computing devices and transferring, by the processing system, the one or more chunks from the edge server directly to the one or more computing devices when needed.

9. The method of claim 1, wherein performing the global optimization comprises performing, by the processing system, a handover operation for one or more video sessions of the plurality of video sessions having weak signal strengths, by enabling the one or more video sessions to connect to at least one neighboring edge server of the plurality of neighboring edge servers having a higher signal strength.

10. The method of claim 9, further comprising increasing, by the processing system, QoE levels of the one or more video sessions by adjusting a bitrate of each video session of the one or more video sessions based on a channel condition of the at least one neighboring edge server.

11. A system, comprising:
    a memory for storing instructions;
    a processing system communicatively coupled to the memory and configured to execute the instructions, and based on the executed instructions, the processing system is further configured to:
        estimate, at an edge server, Quality of Experience (QoE) levels for a plurality of video sessions streamed from a cloud server to one or more computing devices through the edge server,
  wherein the QoE levels are estimated based on one or more metrics associated with the plurality of video sessions;
determine channel status of one or more neighboring edge servers of a plurality of neighboring edge servers proximate to the edge server;
maximize the QoE levels of the plurality of video sessions based on the estimating,
  wherein the processing system is further configured to perform one of a local optimization, a global optimization and a combination of both the local optimization and the global optimization based on the one or more metrics and the channel status determined for the one or more neighboring edge servers,
wherein the local optimization is performed by only the edge server and the global optimization is performed by the edge server and the one or more neighboring edge servers; and
perform collaborative pre-fetching for the global optimization using the one or more neighboring edge servers based on inability of the edge server to pre-fetch one or more chunks due to a highly loaded capacity of the edge server,
  wherein the one or more chunks are pre-fetched by the one or more neighboring edge servers for the plurality of video sessions that are not connected to the one or more neighboring edge servers, and wherein the one or more chunks are transferred to the edge server to which the plurality of video sessions is connected.

12. The system of claim 11, wherein the processing system is further configured to perform Transmission Control Protocol (TCP) splitting by adapting different TCP window sizes for each video session of the plurality of video sessions based on a bitrate value required for each video session.

13. The system of claim 12, wherein the processing system is further configured to:
  perform an explicit window size adaptation operation over split TCP connections to achieve sufficient throughput for each video session of the plurality of video sessions;
  manage at the edge server in real-time, buffer occupancy levels of the one or more computing devices;
  modify buffer size values advertised by the one or more computing devices; and
  transmit the buffer size values that were modified.

14. The system of claim 11, wherein the processing system is further configured to adaptively pre-fetch and transfer the one or more chunks associated with the plurality of video sessions already cached at the edge server to a computing device of the one or more computing devices based on a video consumption rate of each video session of the plurality of video sessions and/or a buffer capacity at the edge server reaching a certain threshold, to fully utilize front-end throughput between the edge server and the computing device.

15. The system of claim 11, wherein the processing system is further configured to:
  perform Adaptive Bitrate (ABR) adaptation by detecting in real-time bandwidth and processing capacities of a computing device of the one or more computing devices; and
adjust a quality of video streams associated with the plurality of video sessions based on the detecting.

16. The system of claim 11, wherein the processing system is further configured to pre-fetch and cache, at the edge server, the one or more chunks associated with the plurality of video sessions required for the one or more computing devices and transfer the one or more chunks from the edge server directly to the one or more computing devices when needed.

17. The system of claim 11, wherein the processing system is further configured to perform a handover operation for one or more video sessions of the plurality of video sessions having weak signal strengths, by enabling the one or more video sessions to connect to at least one neighboring edge server of the plurality of neighboring edge servers having a higher signal strength.

18. The system of claim 17, wherein the processing system is further configured to increase the QoE levels of the one or more video sessions by adjusting a bitrate of each video session of the one or more video sessions depending on a channel condition of the at least one neighboring edge server.

* * * * *